United States Patent [19]

Green

[11] Patent Number: 5,486,072
[45] Date of Patent: Jan. 23, 1996

[54] CUTTING TOOLS OF COMPOSITE CONSTRUCTION

[75] Inventor: Geoffrey C. Green, Bristol, Great Britain

[73] Assignee: British Aerospace PLC, Farnborough, England

[21] Appl. No.: 102,901

[22] Filed: Aug. 6, 1993

[30] Foreign Application Priority Data

Aug. 6, 1992 [GB] United Kingdom ............. 9216699

[51] Int. Cl.⁶ ............................................. B23C 5/10
[52] U.S. Cl. .................... 407/32; 407/119; 408/144; 408/145
[58] Field of Search .................. 407/32, 119; 408/144, 408/145

[56] References Cited

U.S. PATENT DOCUMENTS

| | | | |
|---|---|---|---|
| 4,266,449 | 5/1981 | Bielby | 407/119 |
| 4,642,003 | 2/1987 | Yoshimura | 407/119 |
| 4,708,037 | 11/1987 | Guljan et al. | 82/1.11 |
| 4,762,445 | 8/1988 | Bunting et al. | 408/144 |
| 4,909,677 | 3/1990 | Noguchi et al. | 407/32 |
| 4,984,940 | 1/1991 | Bryant et al. | 407/119 |
| 5,026,227 | 6/1991 | Nishi et al. | 407/119 |
| 5,326,195 | 7/1994 | Brox | 407/32 |

FOREIGN PATENT DOCUMENTS

| | | |
|---|---|---|
| 567630 | 10/1943 | United Kingdom . |
| 698664 | 10/1953 | United Kingdom . |

*Primary Examiner*—Maurina T. Rachuba
*Attorney, Agent, or Firm*—Cushman, Darby & Cushman

[57] ABSTRACT

A cutting tool is provided which comprises a tungsten carbide body or core (2) to which is soldered, brazed or otherwise bonded at least one strip of tungsten carbide (3) that is ground to form a cutting edge or blade. A tough non-vibrating core is thus provided for use with a very hard blade separately replaceable. A method of forming the body or core (2) involves forming a pre-sintered preform, grinding one or more flutes in the preform and subsequently hardening the preform into a fully sintered state ready for use to receive one or more cutting blades.

3 Claims, 2 Drawing Sheets

Fig. 3.
Fig. 4.
Fig. 5.
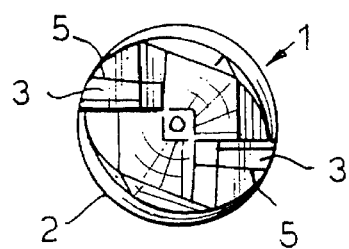
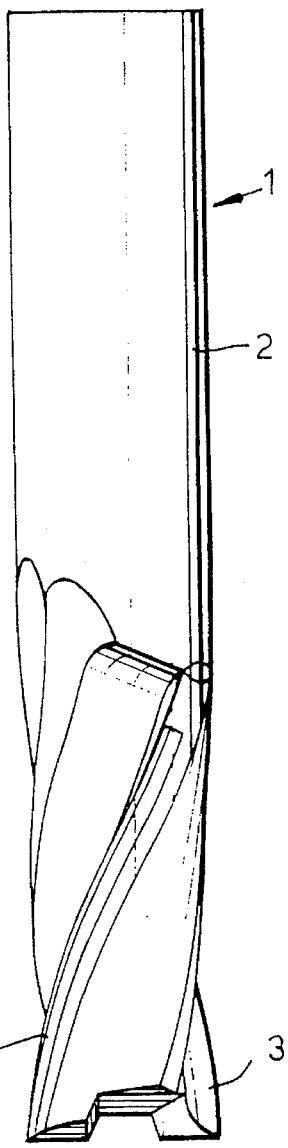
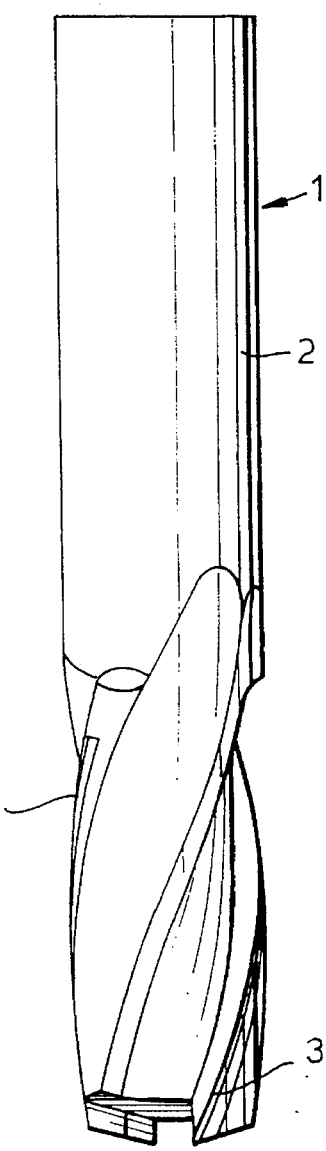

5,486,072

CUTTING TOOLS OF COMPOSITE CONSTRUCTION

BACKGROUND TO THE INVENTION

This invention relates to cutting tools of composite construction.

DESCRIPTION OF THE PRIOR ART

Cutters are known that are manufactured by machining or otherwise forming flutes in a solid rod of high speed steel or tungsten carbide. The flutes can be helical or straight depending on the machining application.

Another known method of producing cutters is to fabricate them from one or more materials. Generally, the core or body is made of high speed steel or high tensile alloy steel to which is brazed strips of tungsten carbide. On some forms of this construction the high speed steel core cuts at the same instant as the tungsten carbide blades; in other types using alloy steels which are too soft for a cutting edge, only the tungsten carbide strips do the cutting.

Experience has shown that any cutter containing steel will resonate under certain machining conditions and once resonance starts there is nothing that can be done by altering spindle speeds and table feeds that will damp the vibration. Altering the composition of the steel, its heat treatment, the flute form or cutting edge geometry can make some improvement but does not give the level of performance required for efficient cutting.

Cutters made from solid tungsten carbide give superior performance to steel cutters and are readily available in lengths of cut of up to twice the cutter diameter. In these short lengths they are cost effective in the smaller sizes because the increase in performance offsets the increase in purchase cost. However, cutters of larger diameter and greater length, made of solid carbide, are sometimes less robust and are prohibitively expensive.

For medium and long series cutters having a cutting length ratio in the order of two to five times, there are few if any solid carbide cutters available which are capable of working at the higher speeds available on modern machine tools designed to cut light alloys. Careful design is essential or else a high failure rate will be experienced.

OBJECTS OF THE INVENTION

Thus there is a requirement for an improved cutter, particularly for finishing operations and long series applications having the following desirable characteristics:
a. fabricated cutter having a tough, non-cutting, core not made of steel to which can be secured very hard cutting edges;
b. a cutter having a dense core that has natural frequency higher than that which will occur during machining;
c. a cutter with replaceable edges that can be reconditioned at lower cost than for a one piece cutter;
d. a cutter with a body and blades made from a material having a similar coefficient of expansion to avoid cracking of the blades during manufacture;
e. a cutter that enables the reuse of valuable and increasingly rare elements such as tungsten and cobalt;
f. a cutter having a length of cut of up to four diameters, and a protrusion of five diameters below the chuck or shank, which can be run at the optimum velocity of tungsten carbide;
g. a cutter having a length of cut to diameter ratio of up to four times, and a protrusion of five diameters below the check, that will produce a good surface finish when run at optimum speeds and feeds.

It is therefore the object of the present invention to provide such an improved cutter.

SUMMARY OF THE INVENTION

According to one aspect of the present invention there is provided a body for a composite cutting tool comprising tungsten carbide material and having at least one flute extending therealong defining a tooth for receiving a strip of material adapted to be ground to form a cutting blade.

The body according to the invention thus provides the advantages of vibration damping of tungsten carbide construction and the cost saving of having replaceable blades.

The at least one flute may be straight or helical and preferably includes a rebate formed in a face thereof for receiving the said strip of material.

The rebate is preferably formed in a generally radially extending face of the flute which leads when the cutter is rotated.

According to a second aspect of the invention there is provided a composite cutting tool comprising a body according to the first aspect of the invention to said at least one flute of which is attached a strip of material ground to form a cutting blade. The strip of material advantageously comprises tungsten carbide material. The body is preferably of a tougher grade of tungsten carbide than that used for the strip of material in order to provide toughness to the cutting tool.

The strip of material may be attached by soldering, brazing or otherwise bonding the same to the body.

The cutting tool according to the invention is able to provide an effective length of cut to diameter ratio of substantially up to five times without risk of breakage.

According to a third aspect of the invention there is provided a method of forming a body for a composite cutting tool including the steps of forming a relatively soft preform of pre-sintered tungsten carbide; forming at least one flute in the preform whereby to form a soft body, and hardening the soft body to a fully sintered condition ready for use.

The body may thus be formed according to this aspect of the invention in a quicker and simpler way than was previously known because the step of forming the at least one flute is carried out on the relatively soft preform in the pre-sintered state. This step can be carried out with far greater speed than it can when forming, usually by grinding, a preform of fully sintered material. It will also be appreciated that wear and tear on forming tools are likely to be much lower.

The method preferably includes the step of forming a rebate in the at least one flute the rebate being adapted to receive a strip of material for grinding to form a cutting blade therein.

Preferably at least one of the steps of forming the flute and rebate is carried out by grinding.

According to a fourth aspect of the invention there is provided a method of forming a composite cutting tool including the steps of forming a body according to the third aspect of the invention followed by the steps of attaching to the at least one flute a strip of material, and grinding the same to form a cutting blade.

According to another respect of the present invention there is provided a cutting tool of composite carbide construction, said cutting tool comprising a tungsten carbide body or core to which is attached by solder, brazing or otherwise bonding, at least one strip of tungsten carbide that is ground to form at least one cutting edge or blade.

BRIEF DESCRIPTION OF THE DRAWINGS:

FIG. 3 is an end view of the cutting tool of the invention, shown with the blades thereof assembled;

FIG. 4 is a left side view of the cutting tool of the invention; and

FIG. 5 is a right side view of the cutting tool of FIG. 4.

DESCRIPTION OF THE PREFERRED EMBODIMENT

Figure 1:
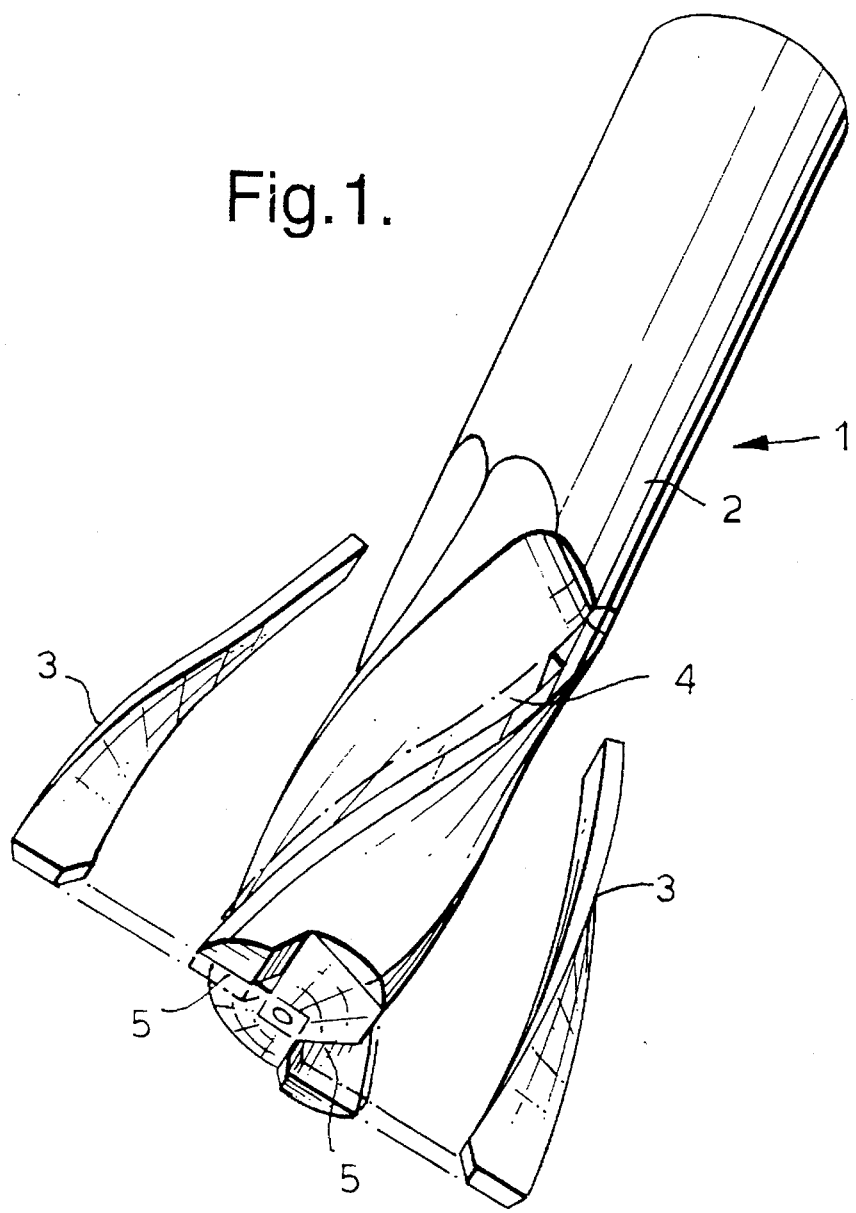
FIG. 1 is an exploded perspective view of the cutting tool provided in accordance with the principles of the present invention.
Figure 2:
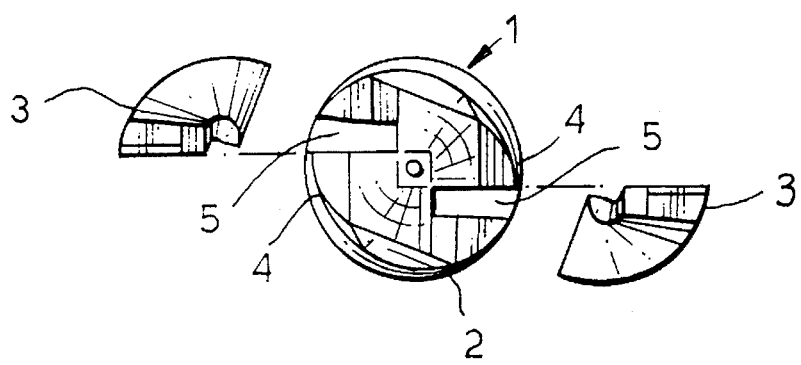
FIG. 2 is an exploded end view of the cutting tool of FIG. 1.

One embodiment of the invention will now be described, by way of example, with reference to the accompanying drawing showing a typical cutter 1 in accordance with the invention having a core 2 of tungsten carbide material and helical blades 3 also of tungsten carbide material but with the core 2 being of softer grade material.

The core 2 includes helical flutes 4 ground along and around its periphery to form teeth such that there is a radial face which leads when the cutter is rotated, with a heel which is a parabolic curve diminishing towards the centre of the cutter. Ground into the front face of each tooth is a rebate 5 forming a seating for the helical blades 3, these being silver soldered or otherwise bonded to the body 2. Grinding of both the flutes and rebates is carried out on the core 2 when in a pre-sintered state in a soft or "green" condition. Once the grinding has been completed the core 2 is hardened to its fully sintered condition and is ready for use to receive one or more helical blades 3 without any further operations needing to be carried out on it.

The benefit of a composite cutter in accordance with the invention is its inherent property of damping vibration caused by sequential striking of the workpiece by the cutting teeth. Toughness is the prime property of the core and its low modulus of elasticity makes it a firm base for the cutting portion.

Further enhancements to this composite construction are possible. For example, alternative blade material may include precious materials such as polychrystalline diamond or polychrystalline cubic boron nitride, silicon aluminium oxy nitride, cermet or ceramic material or other hard materials suitable for forming cutting edges could be used, any of which could be bonded to a substrate of tungsten carbide.

I claim:

1. A composite cutting tool constructed and arranged to be rotated to cut a workpiece, the cutting tool comprising a body of tungsten carbide material and having at least one flute in a periphery thereof and extending therealong defining a tooth, and a strip of tungsten carbide material attached to the tooth and ground to form a cutting blade.

2. A composite cutting tool as in claim 1 in which the body is of a tougher grade of tungsten carbide than that used for the strip of material.

3. A composite cutting tool as in claim 1 constructed and arranged to provide an effective length of cut to diameter ratio of substantially up to five times.

\* \* \* \* \*